UNITED STATES PATENT OFFICE.

GEORGE FRANÇOIS JAUBERT, OF PARIS, FRANCE.

PASTIL FOR MAKING OXYGEN GAS AND PROCESS OF PRODUCING SAME.

SPECIFICATION forming part of Letters Patent No. 691,058, dated January 14, 1902.

Application filed July 3, 1901. Serial No. 67,067. (No specimens.)

*To all whom it may concern:*

Be it known that I, GEORGE FRANÇOIS JAUBERT, a citizen of the Republic of Switzerland, residing at Paris, France, have invented certain new and useful Improvements in Pastils for Making Oxygen Gas and Processes of Producing the Same, of which the following is a specification.

It has often been attempted to employ chlorid of lime in the manufacture of oxygen gas, but hitherto none of the processes proposed has received industrial application.

I have discovered that alkaline peroxids, and in particular sodium dioxid in contact with water, decomposes chlorid of lime, it being at the same time itself decomposed with evolution of oxygen.

The mixture of chlorid of lime and sodium dioxid, which at first sight appears not to be stable, is on the contrary absolutely stable if all trace of humidity be avoided. It may therefore be compressed into pastils or cartridges of all sizes, which by the action of water evolve oxygen gas in an analogous manner to calcium carbid, which under these conditions evolves acetylene.

I proceed as follows: I take two hundred kilograms of chlorid of lime in powder, which titrates 35.5 per cent. of active chlorin, well dried—for example, by standing over concentrated sulfuric acid—and then mix it with seventy-eight kilograms of sodium dioxid in powder. I thus obtain a yellowish-white powder which is made into suitable shapes by strong pressure. The compressed material thus obtained is as hard and shiny as crockery and when placed in water decomposes with regularity, oxygen gas being evolved. The advantages of these novel products will be easily understood if one considers that a very practical method of preparing oxygen gas is to place such in a generator of the type used for acetylene. These bodies are also of value for the transport of oxygen, for with the same weight as the steel cylinders used for transporting compressed oxygen a much greater quantity of oxygen is evolved than that contained in such cylinders. The oxygen obtained is also much purer than that prepared by known processes from baryta, manganate, or even by electrolysis, for when made by this latter process it always contains hydrogen, which passes through the diaphragm. Such compressed mixtures may also be used as means for oxidation, disinfection, purification—in particular for the purification of crude acetylene—for no chlorin, &c., is evolved from such compressed mixture.

If in the example given above sodium dioxid be replaced with the equivalent quantity of potassium tetroxid or by the mixed peroxid of sodium and potassium obtained by oxidation of the liquid alloy of sodium and potassium, analogous results are obtained, as also by using salts of the alkaline-earth metals.

In the carrying out of my invention the chlorid of lime or calcium hypochlorite may be replaced by other hypochlorites of alkaline metals or alkaline-earth metals which are equivalents of the chlorid of lime I prefer to use.

Having thus described the nature and object of my invention, what I claim as new, and desire to secure by Letters Patent, is—

1. The improvement in the art of producing oxygen gas, which consists in first mixing chlorid of lime and an alkaline peroxid, then compressing the mixture under strong pressure, and finally placing the compressed mixture in water, substantially as and for the purposes described.

2. For the production of oxygen gas, a pastil or cartridge consisting of well-dried chlorid of lime and an alkaline peroxid.

3. For the production of oxygen gas, a pastil or cartridge consisting of chlorid of lime and sodium dioxid.

In testimony whereof I have signed this specification in the presence of two subscribing witnesses.

GEORGE FRANÇOIS JAUBERT.

Witnesses:
PAUL DE MESTRAL,
EDWARD P. MACLEAN.